(12) United States Patent
Morikawa et al.

(10) Patent No.: US 9,266,406 B2
(45) Date of Patent: Feb. 23, 2016

(54) AIR-CONDITIONER FOR VEHICLE

(75) Inventors: Masahiko Morikawa, Kitanagoya (JP); Koichi Tabei, Toyota (JP); Koichi Aoishi, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 320 days.

(21) Appl. No.: 14/005,953

(22) PCT Filed: Apr. 9, 2012

(86) PCT No.: PCT/JP2012/002457
§ 371 (c)(1),
(2), (4) Date: Sep. 18, 2013

(87) PCT Pub. No.: WO2012/144155
PCT Pub. Date: Oct. 26, 2012

(65) Prior Publication Data
US 2014/0027090 A1    Jan. 30, 2014

(30) Foreign Application Priority Data

Apr. 19, 2011 (JP) .................................. 2011-093282

(51) Int. Cl.
*B60H 1/00* (2006.01)
*B60H 1/32* (2006.01)
*B60H 3/00* (2006.01)

(52) U.S. Cl.
CPC ........ *B60H 1/00642* (2013.01); *B60H 1/00021* (2013.01); *B60H 1/00742* (2013.01);
(Continued)

(58) Field of Classification Search
CPC ........... B60H 1/00735; B60H 1/00742; B60H 1/00785; B60H 1/00828; B60H 1/00835; B60H 1/00842; B60H 1/00864; B60H 1/00892; B60H 2001/00185; B60H 2001/225
USPC ..................................... 165/202, 203; 62/186
See application file for complete search history.

(56) References Cited

U.S. PATENT DOCUMENTS 4,608,914 A * 9/1986 Shimada ............ B60H 1/00042
454/160
5,390,728 A * 2/1995 Ban .................... B60H 1/00742
165/202

(Continued)

FOREIGN PATENT DOCUMENTS

JP    59-143715      8/1984
JP    2003-182341    7/2003

(Continued)

OTHER PUBLICATIONS

Office Action dated Mar. 31, 2015 in corresponding Chinese Application No. 2012 80019376.6.

(Continued)

*Primary Examiner* — Judy Swann
*Assistant Examiner* — John Higgins
(74) *Attorney, Agent, or Firm* — Harness, Dickey & Pierce, P.L.C.

(57) ABSTRACT

When a predetermined seat air conditioning command is provided to air-condition a predetermined seat, a control part allows conditioned-air to be blown off only from an air outlet air-conditioning the predetermined seat as a control for a predetermined seat state. In the predetermined seat state, when a stop command is provided to stop an air conditioning blower, the control part controls the air conditioning blower to stop sending air, and controls at least one air outlet of a plurality of air outlets into an open state, the at least one air outlet air-conditioning the other seat except the predetermined seat.

5 Claims, 7 Drawing Sheets

(52) U.S. Cl.
CPC ........ *B60H1/00828* (2013.01); *B60H 1/00842* (2013.01); *B60H 1/00864* (2013.01); *B60H 1/3207* (2013.01); *B60H 3/0085* (2013.01); *B60H 2001/00192* (2013.01)

(56) References Cited

U.S. PATENT DOCUMENTS

| | | | |
|---|---|---|---|
| 5,725,052 | A | 3/1998 | Kawai et al. |
| 6,971,446 | B2 * | 12/2005 | Price ................. B60H 1/00742 165/202 |
| 2001/0022092 | A1 | 9/2001 | Yamaguchi et al. |
| 2004/0102151 | A1 * | 5/2004 | Shikata .............. B60H 1/00207 454/120 |
| 2011/0067422 | A1 | 3/2011 | Ichishi et al. |

FOREIGN PATENT DOCUMENTS

| | | |
|---|---|---|
| JP | 2004-196266 | 7/2004 |
| JP | 2006-224705 | 8/2006 |
| JP | 2008-168774 | 7/2008 |

OTHER PUBLICATIONS

Extended European Search Report dated Oct. 24, 2014 in corresponding EP Application No. 12773981.1.
International Search Report (English and Japanese) and Written Opinion of the ISA (Japanese), ISA/JP, mailed Jul. 3, 2012.

* cited by examiner

AIR-CONDITIONER FOR VEHICLE

CROSS REFERENCE TO RELATED APPLICATION

This application is a 371 U.S. National Stage of International Application No. PCT/JP2012/002457, filed Apr. 9, 2012, which is based on Japanese Patent Application No. 2011-93282 filed on Apr. 19, 2011, the disclosure of which is incorporated by reference.

FIELD OF THE INVENTION

The present disclosure relates to an air-conditioner for a vehicle.

BACKGROUND OF THE INVENTION

A distribution apparatus controlling the distribution amount of conditioned-air blown off to a driver seat and the other seat is described, in a conventional air-conditioner for a vehicle (for example, refer to patent document 1).

Moreover, in another conventional air-conditioner for a vehicle, conditioned-air is blown off only to a driver seat by an air-conditioning control. For example, when no occupant is seated on seats other than a driver seat, a passage in the duct communicated with other air outlet provided for the other seats is closed to stop air sending from the other air outlet. Thereby, energy is saved for the air-conditioner in a case where only a driver is in the vehicle.

In the conventional air-conditioner, when a blower is suspended in the state where air is sent to only the driver seat, if an outside air introduction mode is set, the amount of air sent to the driver seat increases too much due to the wind pressure (ram pressure) generated when the vehicle is driving. Moreover, if an inside air introduction mode is set when the blower is suspended in the similar state, air becomes difficult to circulate and the humidity easily becomes high, because many air outlets are closed. Therefore, it is easy to generate window fogging.

PRIOR ART DOCUMENT

Patent Document

Patent document 1: JP-59-143715A

SUMMARY OF THE INVENTION

It is an object of the present disclosure to provide an air-conditioner for a vehicle which restricts a predetermined seat from losing comfortableness.

According to a first aspect of the present disclosure, an air-conditioner for a vehicle includes an air conditioning case having an air intake port on a first side and a plurality of air outlets on a second side, air passing through the plurality of air outlets toward a passenger compartment, the plurality of air outlets being opened to correspond to a plurality of seats including a predetermined seat, which contains at least a driver seat, and the other seat, the air conditioning case having an air passage between the air intake port and the plurality of air outlets, blow-off air passing through the air passage;

an air conditioning blower sending air to the air passage of the air conditioning case;

an air conditioning part which heats or cools to air-condition the air sent from the air conditioning blower and sends conditioned-air to the plurality of air outlets;

an opening-and-closing part which changes opening-and-closing state of the plurality of air outlets between an allowed state and an intercepted state, conditioned-air being allowed to pass an air outlet of the plurality of air outlets which air-conditions the other seat except the predetermined seat in the allowed state and being intercepted in the intercepted state, conditioned-air being allowed to pass an air outlet of the plurality of air outlets which air-conditions the predetermined seat in the intercepted state; and a control part which conducts an air conditioning for the passenger compartment by controlling the air conditioning blower, the air conditioning part and the opening-and-closing part, wherein the control part controls the opening-and-closing part into the intercepted state as a control of a predetermined seat state, when a predetermined seat air conditioning command is provided to air-condition the predetermined seat, when a stop command which requires to stop the air conditioning blower is provided in the predetermined seat state, the control part controls the air conditioning blower to stop sending air, and after the air conditioning blower is stopped, the control part controls the opening-and-closing part to open at least one air outlet of the plurality of air outlets which air-conditions the other seat in a manner that a total open area of the air outlets becomes larger than or equal to a total open area of the air outlets in the predetermined seat state.

The control part controls the opening-and-closing part in the intercepted state as a control of a predetermined seat state, when the predetermined seat air conditioning command which air-conditions the predetermined seat is given. Because the predetermined seat contains at least a driver seat, the predetermined seat is, for example, only a driver seat or a driver seat and a passenger seat. By changing the opening-and-closing part into the intercepted state, conditioned-air can be sent only to an occupant seated on the predetermined seat (hereafter may be referred as a predetermined occupant). Therefore, because the air conditioning range becomes smaller rather than a usual state, the air conditioning capacity can be reduced.

Moreover, the control part controls the air conditioning blower to stop sending air, when a stop command is given in the predetermined seat state. Furthermore, the control part controls the opening-and-closing part in a manner that a total open area of the air outlets in the open state after the air conditioning blower is stopped becomes larger than or equal to a total open area of the air outlets in the open state in the predetermined seat state by opening at least one air outlet corresponding to the other seat among the plurality of air outlets. Therefore, if a stop command is given, the opening-and-closing state of each air outlet is controlled, and the opening area of the air outlets is made to be more than or equal to the before. Thereby, even in a case where the pressure of air outside the passenger compartment (hereafter may be referred as outside air) introduced due to the rise in the vehicle speed becomes high and the outside air introduced from the air intake port flows into the passenger compartment, the air flowing into can be distributed to the other seat, because the air outlet is opened for the other seat. Therefore, the predetermined occupant is restricted from feeling uncomfortable.

Moreover, in a case where air in the passenger compartment (hereafter may be referred as inside air) circulates and the inside air taken from the air intake port is blown off from the air outlet, if the air conditioning blower is stopped, the passage of the circulating air can be increased, because the opening area is more than or equal to the before and the air outlet for the other seat is also opened. Therefore, the humidity can be, restricted from rising and the window fogging can be controlled.

Thereby, even if the air conditioning blower is stopped while carrying out the control of the predetermined seat state, the air-conditioner for a vehicle is realizable in which the predetermined seat is restricted from losing comfortableness.

For example, when a stop command is provided in the predetermined seat state, the control part controls the air conditioning blower to stop sending air, and controls the opening-and-closing part to increase the number of the air outlets in the open state rather than the number of the air outlets which were in the open state in the predetermined seat state.

When a stop command is given in the predetermined seat state, the control part controls the air conditioning blower to stop sending air, and controls the opening-and-closing part to increase the number of the air outlets in the open state rather than the number of the air outlets which were in the open state in the predetermined seat state. Therefore, if a stop command is given, the opening-and-closing state of each air outlet is controlled, and the number of the air outlets in the open state is increased. Thereby, even in the case where the outside air introduced from the air intake port flows into the passenger compartment as mentioned above, the air flowing into can be distributed by increasing the number of the air outlets in the open state. Therefore, the predetermined occupant can be restricted from feeling uncomfortable.

Moreover, if the air conditioning blower is stopped while the inside air taken from the air intake port is blown off from the air outlet, the passage of the circulating air can be increased, because the number of the air outlets in the open state is increased. Therefore, the humidity can be restricted from increasing and the window fogging can be controlled.

Thus, the air-conditioner for a vehicle is realizable in which the predetermined seat is restricted from losing comfortableness even if the air conditioning blower for is stopped while carrying out the control of the predetermined seat state.

For example, the predetermined seat is a driver seat and the other seat is a passenger seat and a rear seat, and the control part controls the air conditioning blower to stop sending air, and controls the opening-and-closing part to open the air outlet air-conditioning the driver seat and the passenger seat and to close the air outlet air-conditioning the rear seat, when a stop command is given in the predetermined seat state.

The control part controls the air conditioning blower to stop sending air, and controls the opening-and-closing part to open the air outlet air-conditioning the driver seat and the passenger seat and to close the air outlet air-conditioning the rear seat. Therefore, the number of the air outlets in the opened state is increased rather than that when only the driver seat is in the air conditioning range and is decreased rather than that when all the seats (the driver seat, the passenger seat, and the rear seat) are in the air conditioning range. Thus, the effect obtained by increasing the number of air outlets mentioned above is achieved while the power for opening is restricted from increasing and the time taken for opening is shortened by restricting the number of the air outlets in the open state. Moreover, the front seat state in which the front seat (driver seat and passenger seat) is set in the air conditioning range is between the driver seat state in which only the driver seat is in the air conditioning range and the all seat state in which all the seats are made in the air conditioning range. Therefore, the shift to the driver seat state and the all seat state from the front seat state can be performed in a short time compared with the transfer time between the driver seat state and the all seat state. Therefore, when the air conditioning blower is stopped, the front seat state is set, thereafter when the air conditioning blower is again started, the shift to the driver seat state or the all seat states can be performed in a short time.

For example, when a stop command is provided in the predetermined seat state, the control part controls the air conditioning blower to stop sending air, and controls the opening-and-closing part so that the number of the air outlets in the open state is increased rather than the number of the air outlets which were in the open state in the predetermined seat state and is decreased rather than all the number of the air outlets.

The control part controls the opening-and-closing part so that the number of the air outlets in the open state is increased rather than the number of the air outlets which were in the open state in the predetermined seat state and is decreased rather than all the number of the air outlets. The number of the air outlets in the open state is smaller than the number of all the air outlets. If all the air outlets are opened, the power for opening is increased, and the time taken for opening becomes long. So, in the present disclosure, the effect obtained by increasing the number of the air outlets mentioned above is attained while the power for opening is restricted from increasing and the time taken for opening is shortened by restricting the number of the air outlets to be opened.

BRIEF DESCRIPTION FOR DRAWINGS

EMBODIMENT TO PRACTICE THE INVENTION

Figure 1:
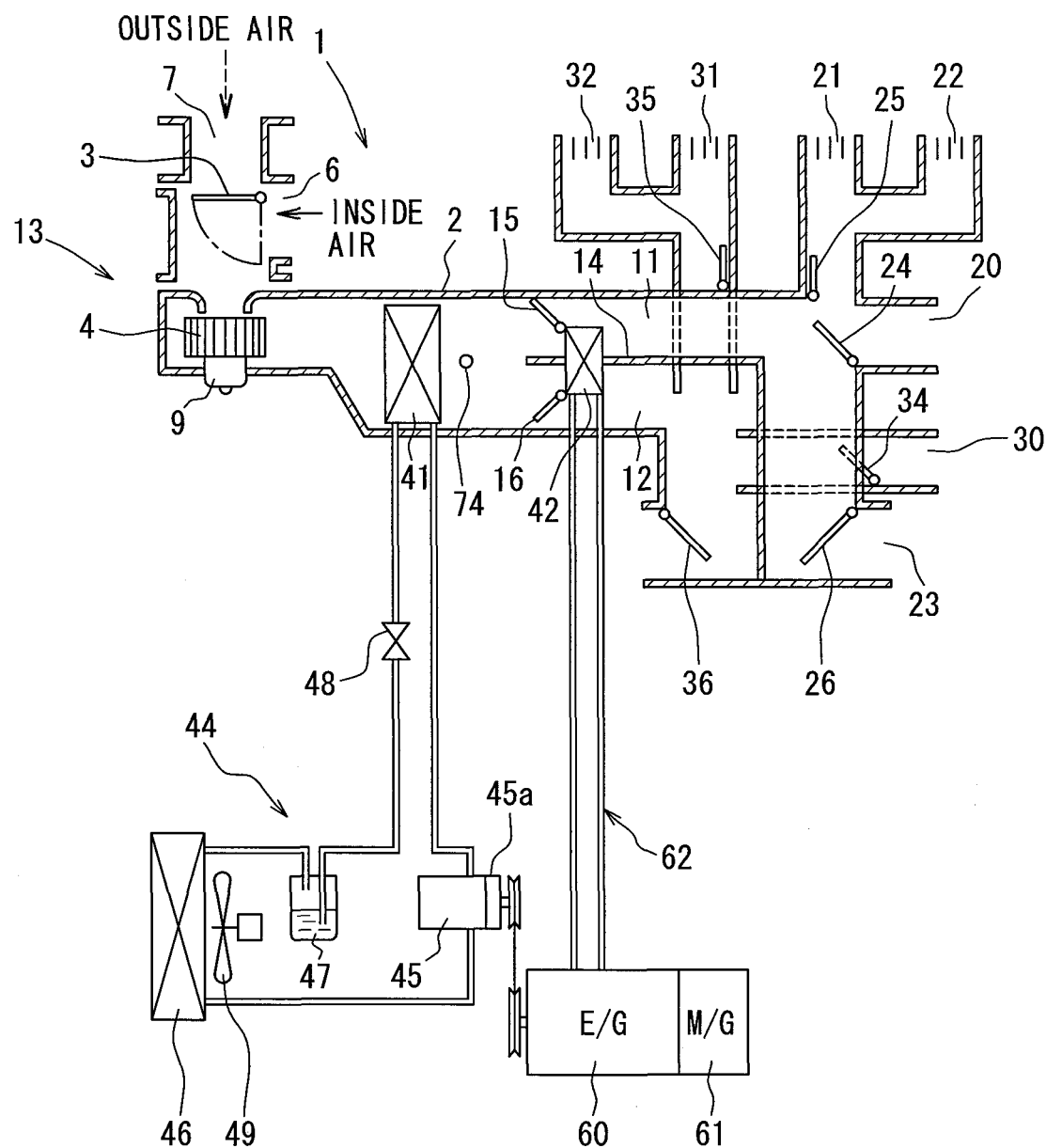
FIG. 1 is a schematic view illustrating an entire structure of an air conditioner for a vehicle according to an embodiment.

An embodiment will be described with reference to FIGS. 1-8. An air-conditioner 100 according to the embodiment is mounted in a hybrid car. The hybrid car is constructed to include an engine 60 for traveling, an engine start equipment (not shown), an electric motor 61 for traveling, a hybrid ECU (not shown), and an engine ECU 62.

The engine 60 is connected to drive an axle of the hybrid car in the attachable and detachable state. The electric motor 61 is connected to drive the axle of the hybrid car in the attachable and detachable state. The electric motor 61 is connected with the axle when the engine 60 is not connected to the axle. Therefore, either one of the engine 60 and the electric motor 61 is connected with the axle, and the other is not connected to the axle. The electric motor 61 is constructed to be automatically controlled (for example, inverter control) by the hybrid ECU. The engine start equipment starts the engine 60. When a run of the hybrid car and a charge of a battery are required, the engine ECU 63 actuates the engine 60 by controlling the energization of the engine start equipment. The hybrid ECU communicates with the engine ECU 63, and suspends the engine 60 and actuates the electric motor 61, if needed, in a traveling time, such that the combustion efficiency of gasoline (fuel) becomes the optimal.

Next, the air-conditioner 100 will be described. The air-conditioner 100 is what is called an auto air-conditioner system constructed so that an air conditioning unit 1 which air-conditions inside of a passenger compartment is controlled by an air-conditioner ECU 10, in a vehicle such as a car including a water-cooled engine for traveling.

The air conditioning unit 1 is an air-conditioner unit which is able to conduct a temperature control for a driver seat side air conditioning space and a passenger seat side air conditioning space, in the passenger compartment, and a change for the air outlet mode, mutually independently. The driver seat side air conditioning space is a space including a driver seat and a rear seat behind the driver seat. Moreover, the passenger seat side air conditioning space is a space including a passenger seat and a rear seat behind the passenger seat.

The air conditioning unit 1 is arranged in the front side of the passenger compartment of the vehicle, and has an air conditioning case 2 where blow-off air passes inside. A first side of the air conditioning case 2 has an air intake port, and a second side of the air conditioning case 2 has plural air outlets through which air passes toward the passenger compartment. The air conditioning case 2 has an air passage through which the blow-off air passes between the air intake port and the air outlets. A blower unit 13 is provided in the upstream (the first side) of the air conditioning case 2. The blower unit (air conditioning blower) 13 includes an inside/outside air switch door 3 and a blower 4. The inside/outside air switch door 3 is driven by an actuator such as a servo motor 5, and is an inlet-port switch part which changes an opening degree of an inside air inlet port 6 and an outside air inlet port 7 corresponding to the air intake port.

The air conditioning unit 1 is called as a complete center layout type which is mounted under an instrument board ahead of the passenger compartment and is located at a center position in a vehicle left-and-right direction, that is not illustrated in details. The blower unit 13 is placed on the front side from the air conditioning unit 1 in the vehicle. The inside air inlet port 6 of the blower unit 13 is opened on the lower side of the driver seat side, and draws air in the passenger compartment from the driver seat side.

The blower 4 is a centrifugal type fan driven by a blower motor 9 which is controlled by a blower drive circuit 8, and generates air flow flowing toward the passenger compartment in the air conditioning case 2. The blower 4 also has the function changing the blow-off air amount of conditioned-air blown from each air outlet 20-23, 30-33 on the driver seat side and the passenger seat side, to be mentioned later, toward the driver seat side air conditioning space and the passenger seat side air conditioning space in the passenger compartment, respectively.

An evaporator 41 and a heater core 42 are arranged in the air conditioning case 2 as an air conditioning part which heats or cools air sent from the blower unit 13 and sends the conditioned-air to the plural air outlets. The evaporator 41 functions as a cooler which cools air passing through the air conditioning case 2.

Moreover, the heater core 42 is arranged downstream of the evaporator 41 in the air flow direction, and heats air passing through a first air passage 11 and a second air passage 12 by exchanging heat with the cooling water of the engine 60 as a heater. The cooling water of the engine 60 circulates in a cooling water circuit 62, in which a water pump (not shown) circulates the cooling water warmed by the water jacket of the engine 60, and the cooling water circuit 62 has a radiator (not shown), a thermostat (not shown), and the heater core 42. The heater core 42 corresponds to a main heating device of the present disclosure. The cooling water which cools the engine 60 flows inside the heater core 42, thereby reheating cool air using this cooling water as a heat source for heating. The heater core 42 is placed downstream of the evaporator in the air conditioning case so as to partially close the first air passage 11 and the second air passage 12.

Each of the first air passage 11 and the second air passage 12 is partitioned by a partition board 14. A driver seat side air mixing door 15 and a passenger seat side air mixing door 16 are arranged upstream of the heater core 42 in the air flow direction, which mutually independently conduct temperature control of the driver seat side air conditioning space and the passenger seat side air conditioning space in the passenger compartment.

Each air mixing door 15, 16 is driven by an actuator such as a servo motor 17, 18, and changes the blow off temperature of conditioned-air blown off from each air outlet 20-23, 30-33 on the driver seat side and the passenger seat side toward each air conditioning space in the passenger compartment, respectively. In other words, the air mixing door 15, 16 functions as an air mix part which adjusts the air amount ratio between the air passing through the evaporator 41 and the air passing through the heater core 42.

The evaporator 41 is one component of a refrigerating cycle 44. The refrigerating cycle 44 includes a compressor 45 belt-driven by an output shaft of the engine 60 mounted in an engine compartment of the vehicle to compress and discharge refrigerant, a condenser 46 condensing refrigerant discharged from the compressor 45, a receiver 47 separating liquid refrigerant flowing out of the condenser 46 into gas and liquid, an expansion valve 48 adiabatically expanding the liquid refrigerant flowing out of the receiver 47, and the evaporator 41 evaporating the gas-liquid two phase state refrigerant flowing out of the expansion valve 48.

An electromagnetic clutch 45a is connected to the compressor 45 of the refrigerating cycle 44, and intermittently transmits the rotation power from the engine 60 to the compressor 45 as a clutch part. The electromagnetic clutch 45a is controlled by a clutch drive circuit 45b.

When the electromagnetic clutch 45a is supplied with electricity (ON), the rotation power of the engine 60 is transmitted to the compressor 45, and the evaporator 41 cools air. When the energization of the electromagnetic clutch 45a is stopped (OFF), the engine 60 and the compressor 45 are disconnected from each other, and the air cooling action by the evaporator 41 is suspended. ON/OFF of the electromagnetic clutch 45a is controlled according to the comparison result between the after-eva temperature (TE) detected by an after-evaporator temperature sensor 74 and a target after-eva temperature (TEO).

Moreover, the condenser 46 is an outdoor heat exchanger which is arranged at a place easily receiving the running wind produced when the hybrid car travels, in which refrigerant flowing inside exchanges heat with outside air ventilated by a cooling fan 49 and the running wind.

As shown in FIG. 1, the second side of the air conditioning case 2, i.e., downstream of the first air passage 11 in the air flow direction, communicates with a driver seat side defroster air outlet 20, a driver seat side center face air outlet 21, a driver seat side side-face air outlet 22, and a driver seat side foot air outlet 23 through each blow-off duct. Moreover, as shown in FIG. 1, the downstream of the second air passage 12 in the air flow direction communicates with a passenger seat side defroster air outlet 30, a passenger seat side center face air outlet 31, a passenger seat side side-face air outlet 32, and a passenger seat side foot air outlet 33 through each blow-off duct.

The driver seat side and passenger seat side defroster air outlets 20, 30 construct an air outlet from which conditioned-air is blown off toward a windshield of the vehicle. The driver seat side and passenger seat side face air outlets 21, 22, 31, 32 construct an air outlet from which conditioned-air is blown off toward head and breast of a driver and a passenger seat occupant. The driver seat side and passenger seat side foot air outlets 23, 33 construct an air outlet from which conditioned-air is blown off toward foot of the driver and the passenger seat occupant.

Figure 2:
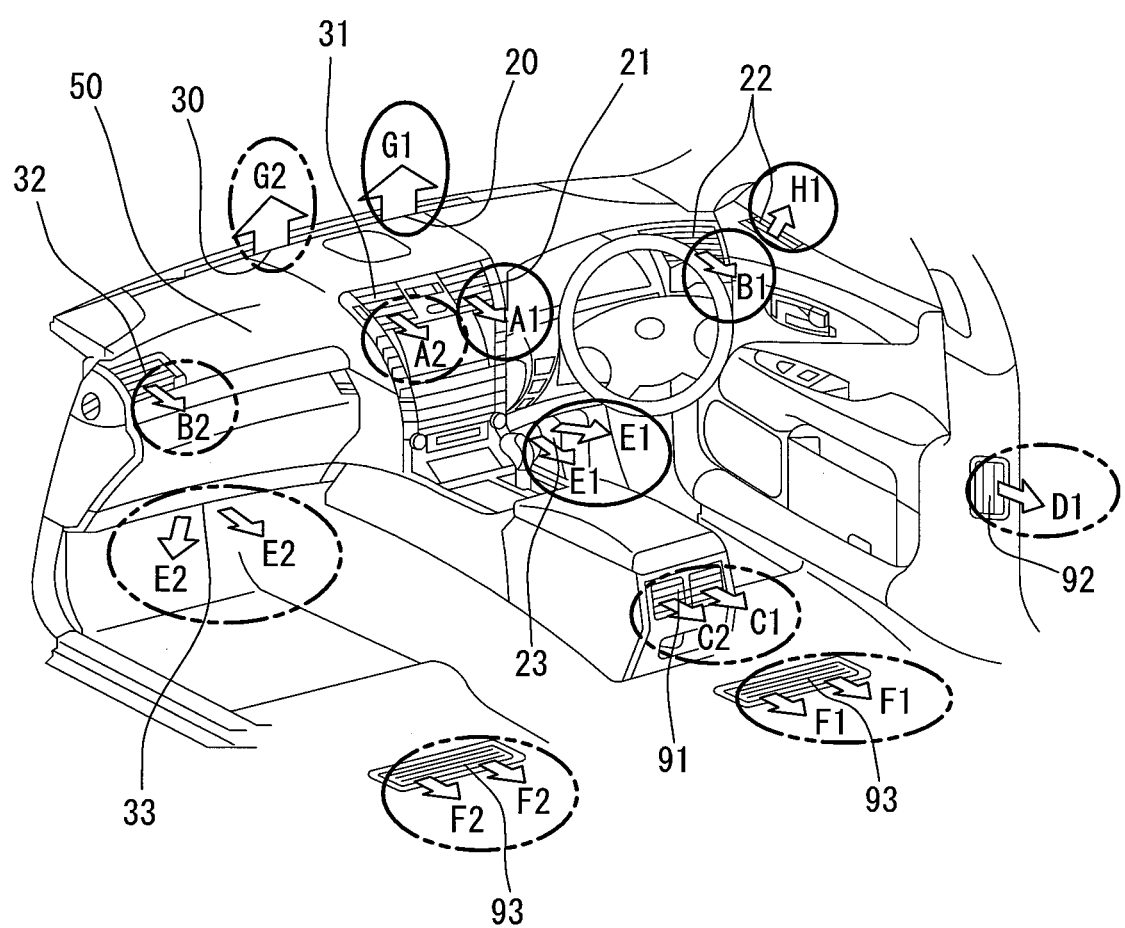
FIG. 2 is a perspective view illustrating a passenger compartment of the vehicle to which the air conditioner is provided.
Figure 3:
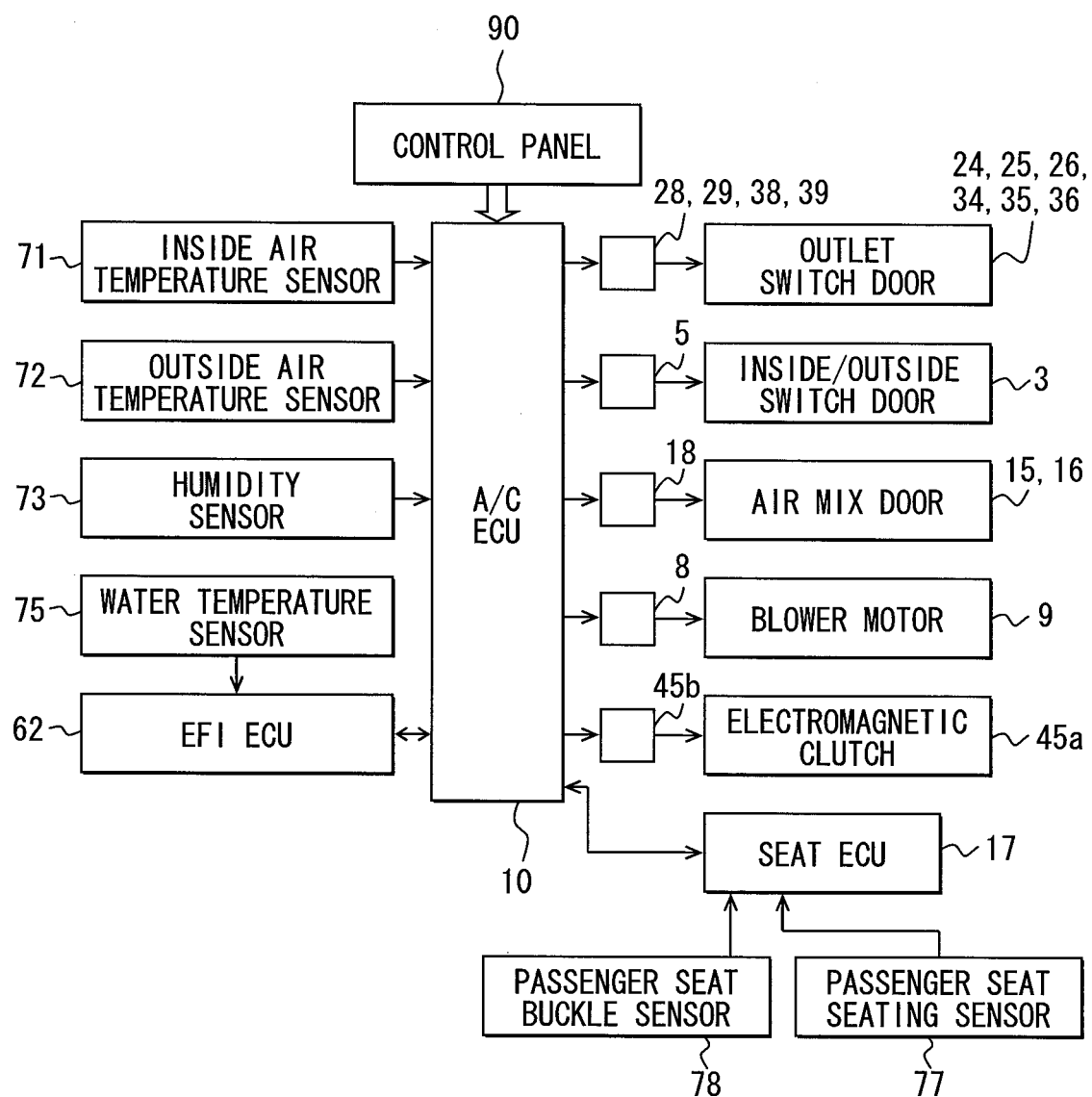
FIG. 3 is a block diagram illustrating an electric construction of the air conditioner.

Moreover, the illustration is omitted in FIG. 1, as shown in FIG. 2, a rear seat side center face air outlet 91, a rear seat side face air outlet 92, and a rear seat side foot air outlet 93 are defined at each downstream of the first air passage 11 and the second air passage 12 as an air outlet to the rear seat.

A driver seat side defroster door 24 and a passenger seat side defroster door 34, a driver seat side face door 25 and a passenger seat side face door 35, a driver seat side foot door 26, and a passenger seat side foot door 36 are defined in the first and second air passage 11, 12 as a driver seat side and passenger seat side air outlet switch door which mutually independently sets up the blow-off mode for the driver seat and the passenger seat in the passenger compartment.

The driver seat side and the passenger seat side air outlet switch door 24-26, 34-36 is driven by an actuator such as a servo motor 28, 29, 38, 39, and changes each blow-off mode for the driver seat and the passenger seat. The passenger seat side air outlet switch door 34-36 is an opening-and-closing part which switches an allowed state and an intercepted state from each other. A passing of the conditioned-air blown off from the air outlets 30-33 covering an air conditioning area corresponding to the other seat other than the seat of the driver (driver seat) of the plural air outlets 20-23, 30-33 is allowed in the allowed state and is intercepted in the intercepted state. The air conditioning area represents a range in which the conditioned-air blown off from each air outlet 20-23, 30-33 mainly circulates, and is determined by the blow-off direction of each air outlet 20-23, 30-33 and an obstacle such as seat which exists in the blow-off direction. The driver seat and the passenger seat have a face mode, a bilevel (B/L) mode, a foot mode, a foot/defroster mode and a defroster mode as the blow-off mode.

Next, an electric structure of the air-conditioner 100 will be described hereinafter. An air-conditioner ECU 10 is a control part, which is energized with direct current power from a battery (not shown) which is an in-vehicle power source mounted to the vehicle, when an ignition switch is turned on which manages start and stop of the engine 60, so as to start computing processing and controlling processing. A communication signal outputted from the engine ECU 62, a switch signal from each switch on the control panel provided to the front face of the passenger compartment, and a sensor signal from each sensor are inputted into the air-conditioner ECU 10. The engine ECU 62 is also called as EFI (Electronic Fuel Injection) ECU.

Figure 4:
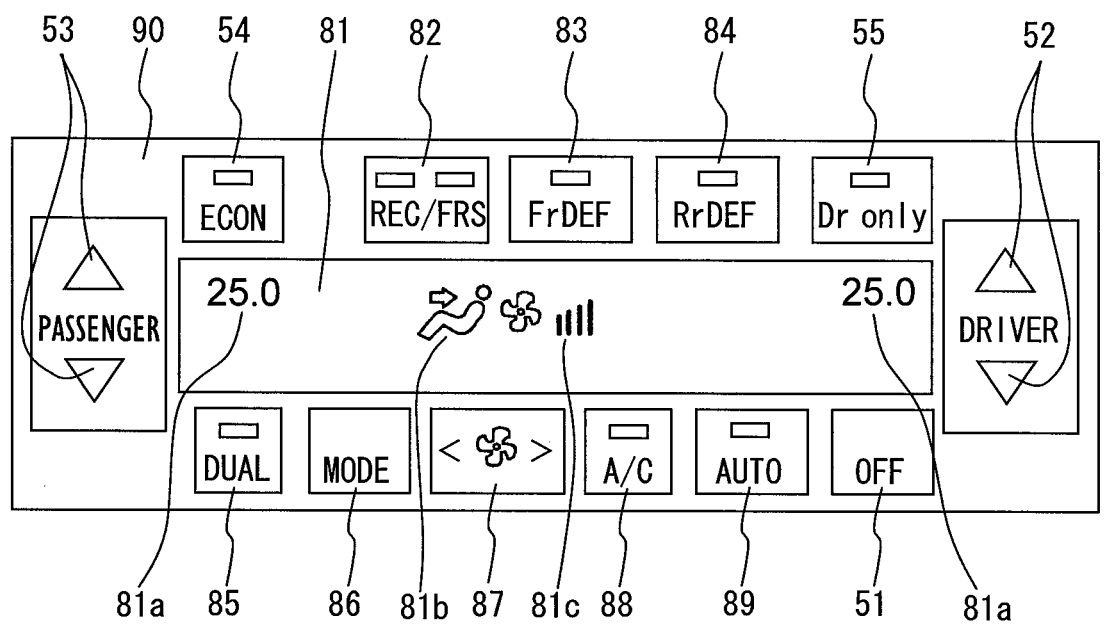
FIG. 4 is a front view illustrating a control panel.

Here, a control panel 90 is explained. FIG. 4 is a front view illustrating the control panel 90. The control panel 90 is installed integrally with the instrument panel 50. The control panel 90 has, for example, a liquid crystal display 81, an inside/outside air changeover switch 82, a front defroster switch 83, a rear defroster switch 84, a dual switch 85, a blow-off mode changeover switch 86, a blower air-amount changeover switch 87, an air-conditioning switch 88, an auto switch 89, an off switch 51, a driver seat side temperature setting switch 52, a passenger seat side temperature setting switch 53, a fuel consumption improvement switch 54, and a centralized-control switch 55 (referred as a driver seat air conditioning switch, a single-seat priority switch, or a single-seat concentrated switch).

The liquid crystal display 81 has a set temperature display part 81a which visually displays the set temperature of the driver seat side and the passenger seat side air conditioning space, a blow-off mode display part 81b which visually displays the blow-off mode, and an air-amount display part 81c which visually displays the blower air amount. The liquid crystal display 81 may further have an outside air temperature display part, an intake mode display part, and a time display part. Moreover, the various kinds of operation switches on the control panel 90 may be defined on the liquid crystal display 81.

The various kinds of switches on the control panel 90 are explained. The front defroster switch 83 corresponds to an air conditioning switch which orders to raise the antifogging property of the windshield or not, and is a defroster mode demand part requiring to set the defroster mode as the blow-off mode. The dual switch 85 is a right-and-left independent control directive part which orders the right-and-left independent thermal control which performs temperature control of the driver seat side air conditioning space and temperature control of the passenger seat side air conditioning space independently from each other. The mode changeover switch is a mode demand part requiring to set the blow-off mode into either one of the face mode, the bilevel (B/L) mode, the foot mode and the foot/defroster mode according to manual operation by an occupant. The air conditioning switch 88 is an air conditioning operation switch which orders the compressor 45 of the refrigerating cycle 44 to operate or stop. The air conditioning switch 88 is provided to raise gas mileage by reducing the rotation load of the engine 60 which is achieved by stopping the compressor 45. The temperature setting switch 52, 53 is the driver seat side and the passenger seat side temperature setting part for setting each temperature for the driver seat side air conditioning space and the passenger seat side air conditioning space into a desired temperature (Tset). The fuel consumption improvement switch 54 is an economy switch which orders to perform economical air conditioning control or not in consideration of low fuel consumption and power saving by lowering the operation rate of the compressor 45 of the refrigerating cycle 44. The centralized-control switch 55 is an input unit requiring to set the centralized-control mode to be mentioned later as the air conditioning mode according to manual operation by an occupant.

The control panel 90 is installed integrally with the instrument panel 50, and a control panel (not shown) is also installed for the rear seat. The control panel for the rear seat is installed, for example, in the upper part of the rear seat, and a require to put the rear seat into the air conditioning area is input into the control panel for the rear seat.

A well-known microcomputer, which is not illustrated, is prepared inside the air-conditioner ECU 10, and is constructed to include functions of CPU (central processing unit) which performs the computing processing and the controlling processing, a memory such as ROM or RAM and an I/O port (input/output circuit). A sensor signal from various sensors is made to have ND conversion by the I/O port or an A/D conversion circuit, and is inputted into the microcomputer. The air-conditioner ECU 10 is connected with an inside air temperature sensor 71 detecting the air temperature around the driver seat (inside air temperature) Tr corresponding to an inside air temperature detecting element, an outside air temperature sensor 72 detecting the air temperature outside the passenger compartment (outside air temperature) corresponding to an outside air temperature detecting element, and a solar radiation sensor (not shown) corresponding to a solar radiation detecting element. Moreover, the after-evaporator temperature sensor 74 detecting the air temperature immediately after passing the evaporator 41 (after-eva temperature TE) corresponding to an after-eva temperature detecting element, and a humidity sensor 73 detecting the relative humidity in the passenger compartment corresponding to a humidity detecting element are connected to the air-conditioner ECU 10.

Further, the air-conditioner ECU 10 sends and receives information mutually with the engine ECU 62 and a seating ECU 17 which detects occupant seating state through multiplex communication by cooperating with other ECU. A cooling-water-temperature sensor 75 is connected with the engine ECU 62, and detects engine-cooling-water temperature of the vehicle as a water temperature detecting element, so as to define the heating temperature of the blow-off air. The air-conditioner ECU 10 acquires the cooling-water-temperature through the engine ECU 62.

Moreover, the seating ECU 17 is connected to a passenger seat seating sensor 77 and a passenger seat buckle sensor 78. The passenger seat seating sensor 77 is an electrical-contact type detecting element in which an electrical contact point is contacted by load applied to a seat surface when an occupant sits on the passenger seat, or is a detecting element (strain gauge) which detects the amount of distortion by the load applied to the seat surface. Therefore, the passenger seat seating sensor 77 has the function of load detecting element (weight detection sensor) detecting the load applied to the seat surface of the passenger seat. When the load is more than or equal to a predetermine value, the passenger seat seating sensor 77 outputs a signal to the seating ECU 17 which shows that the load is more than or equal to the predetermine value.

The passenger seat buckle sensor 78 is a sensor which detects whether the seat belt of the passenger seat is used. Therefore, the passenger seat buckle sensor 78 functions as a belt detecting element which detects the use of the seat belt of the passenger seat. When the seat belt is used, the passenger seat buckle sensor 78 outputs a signal indicating the wearing state to the seating ECU 17.

Signals are inputted into the seating ECU 17 from the passenger seat seating sensor 77 and the passenger seat buckle sensor 78, respectively. In other words, the passenger seat seating sensor 77 and the passenger seat buckle sensor 78 are connected with the seating ECU 17 in parallel. When at least one of the passenger seat seating sensor 77 and the passenger seat buckle sensor 78 detects the seating, the seating ECU 17 determines that an occupant is on the passenger seat. Therefore, even if the seat belt is unfastened, for example, during a stop time or a parked time, the seating can be detected by the passenger seat seating sensor 77. The air-conditioner ECU 10 acquires information about the seating state through the seating ECU 17.

A temperature sensitive element such as thermistor is used for the inside air temperature sensor 71, the outside air temperature sensor 72, the after-evaporator temperature sensor, and the cooling-water-temperature sensor 75. The inside air temperature sensor 71 is placed at a position near the driver seat (for example, inside the instrument panel 50 near a steering), hardly affected if air outlets other than the air outlet for the driver seat are closed. Moreover, the solar radiation sensor has a driver seat side solar radiation degree detecting element which detects the solar radiation amount (solar radiation degree) irradiated to the driver seat side air conditioning space, and a passenger seat side solar radiation degree detecting element which detects the solar radiation amount (solar radiation degree) irradiated to the passenger seat side air conditioning space, and is made of, for example, photodiode. The humidity sensor 73 is accommodated in a recess formed in the front face of the instrument panel 50 near the driver seat, for example, together with the inside air temperature sensor 71, and is used for determining the necessity of the defroster blow-off for antifogging of the windshield.

Figure 5:
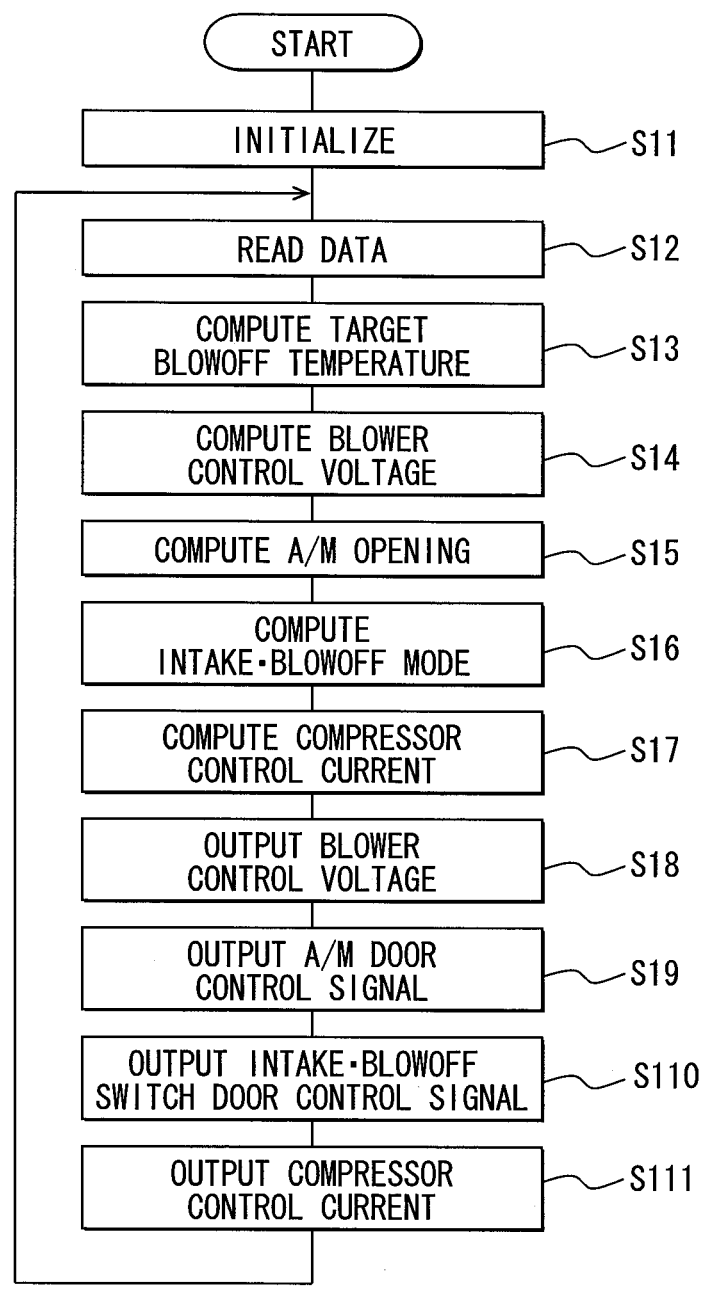
FIG. 5 is a flow chart illustrating a processing example at a normal mode.

Next, a control method by the air-conditioner ECU 10 will be descried with reference to FIG. 5. FIG. 5 is a flow chart illustrating one example of processing performed by the air-conditioner ECU 10 in a normal mode. First, when an ignition switch is turned on, a direct current power is supplied to the air-conditioner ECU 10, and the control program of FIG. 5 beforehand memorized in the memory will be executed.

At Step S11, the memory content of the memory for data processing embedded in the microcomputer inside the air-conditioner ECU 10 is initialized, and it is moved to Step S12. At Step S12, various data is read into the memory for data processing, and it is moved to Step S13. Therefore, at Step S12, the switch signal from the various operation switches on the control panel 90 and the sensor signal from various sensors are inputted. The sensor signal may be the passenger compartment inside temperature Tr detected by the inside air temperature sensor 71, the outside air temperature Tam detected by the outside air temperature sensor 72, the solar radiation amount Is detected by the solar radiation sensor, the after-eva temperature Te detected by the after-evaporator temperature sensor, and the cooling water temperature Tw detected by the cooling-water-temperature sensor 75.

At Step S13, the input data is input to the memorized computing equation so as to calculate the driver seat side target blow-off temperature TAO(Dr) and the passenger seat side target blow-off temperature TAO(Pa), and the target after-eva temperature TEO is calculated based on the driver seat side and passenger seat side target blow off temperature TAO(Dr), TAO(Pa) and the outside air temperature Tam, and it is moved to Step S14.

An example of the computing equation used at Step S13 is shown in the expression 1.

$$TAO = Kset \times Tset - Kr \times Tr - Kam \times Tam - Ks \times Ts + C \qquad (1)$$

Here, Tset is a set temperature set through each temperature setting switch. Tr is an inside air temperature detected by the inside air temperature sensor 71. Tam is an outside air temperature detected by the outside air temperature sensor 72. Ts is a solar radiation amount detected by the solar radiation sensor. Kset, Kr, Kam and Ks are gains, and C is a correcting constant for the whole. Therefore, the air-conditioner ECU 10 has a function as a target blow-off temperature determination part which determines the target blow-off temperature using the air temperature detected by the inside air temperature sensor 71.

At Step S14, the blower air amount, i.e., the blower control voltage VA impressed to the blower motor 9, is calculated based on the calculated driver seat side and passenger seat side target blow-off temperature TAO(Dr), TAO(Pa), and it is moved to Step S15. The blower control voltage VA is obtained by calculating the blower control voltage VA(Dr), VA (Pa) respectively suited to the driver seat side and passenger seat side target blow-off temperature TAO(Dr), TAO(Pa) based on a predetermined characteristics pattern, and by performing an equalization treatment of the blower control voltage VA(Dr), VA(Pa).

At Step S15, the driver seat side and passenger seat side target blow-off temperature TAO(Dr), TAO(Pa) and the input data in Step S12 are input into the computing equation memorized in the memory, so as to calculate the air mix opening SW(Dr) (%) of the driver seat side air mixing door 15 and the air mix opening SW(Pa) (%) of the passenger seat side air mixing door 16, and it is moved to Step S16. Therefore, the air-conditioner ECU 10 has a function as an air amount ratio determination part which determines the air mix opening using the target blow-off temperature.

At Step S16, the intake mode of the air flow drawn into the passenger compartment and the blow-off mode of the air flow blown off into the passenger compartment are determined based on the driver seat side and passenger seat side target blow-off temperature TAO(Dr), TAO(Pa) calculated at Step S13, and it is moved to Step S17.

At Step S17, ON/OFF of the compressor 45 is controlled by feedback control (PI control) in a manner that the driver seat side and passenger seat side target blow-off temperature TAO(Dr), TAO(Pa) calculated at Step S13 agrees with the actual after-eva temperature Te detected by the after-evaporator temperature sensor 74, and it is moved to Step S18.

At Step S18, a control signal is outputted to the blower drive circuit 8 to apply the blower control current VA calculated at Step S14, and it is moved to Step S19. At Step S19, a control signal is outputted to the servo motor 17, 18 to have the air mix opening SW(Dr), SW(Pa) determined at Step S15, and it is moved to Step S110.

At Step S110, a control signal is outputted to the servo motor 28, 29, 38, 39 to set the intake mode and the blow-off mode determined at Step S16, and it is moved to Step S111. At Step S111, the ON/OFF control determined at Step S17 is outputted to the clutch drive circuit 45*b*, and it returns to Step S12 to repeat the processing Step S12 to Step S111. By repeating such a series of treatment, the passenger compartment temperature set by the occupant can be achieved.

Figure 6:
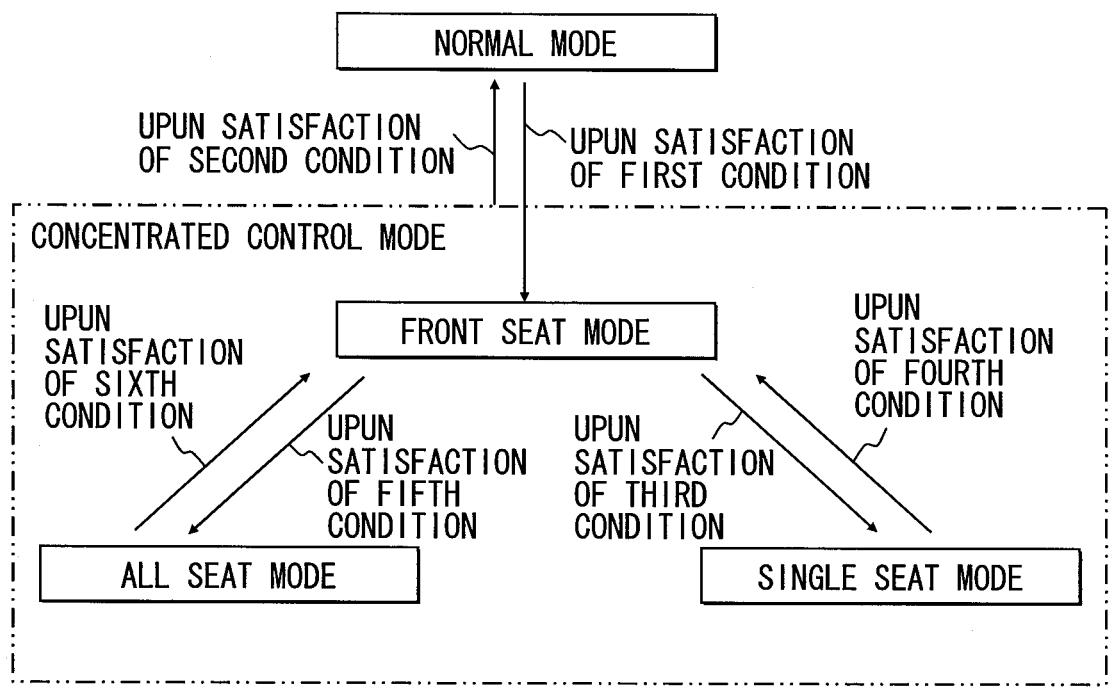
FIG. 6 is a state transition diagram illustrating a transition of a control mode.
Figure 7:
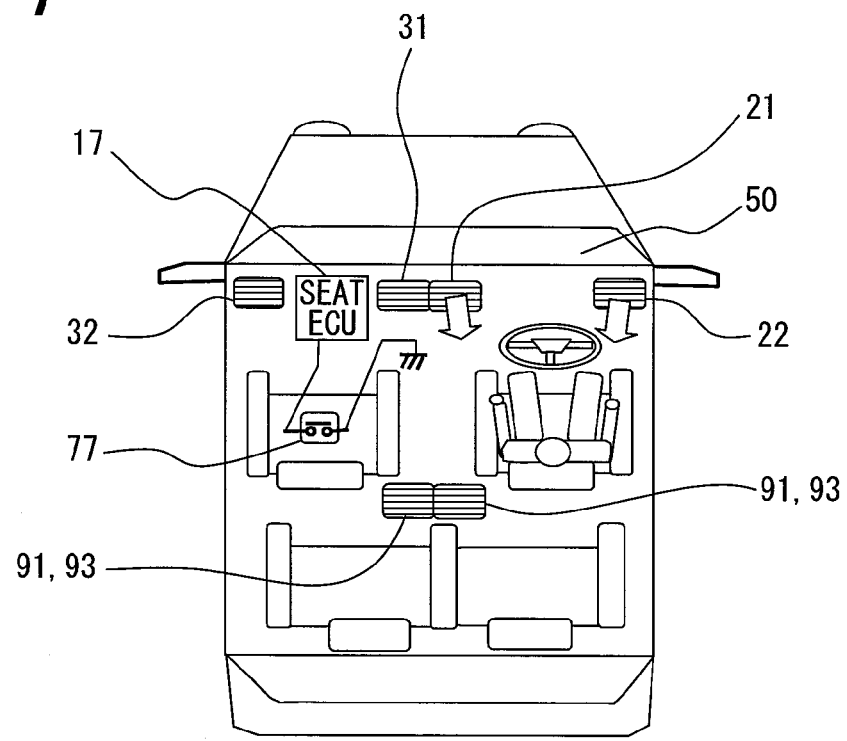
FIG. 7 is a schematic view illustrating the passenger compartment at a single seat mode.
Figure 8:
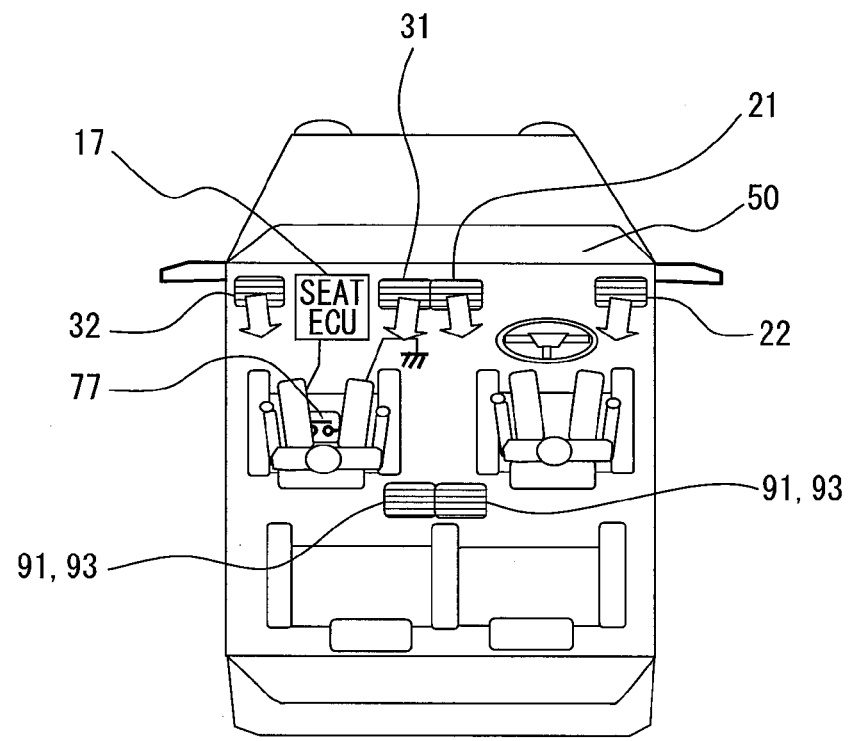
FIG. 8 is a schematic view illustrating the passenger compartment at a front seat mode.

Next, the control mode of the air-conditioner 100 is explained using FIGS. 6-8. FIG. 6 is a state transition diagram illustrating a transition of the control mode. FIG. 7 is a schematic view illustrating the passenger compartment at a single seat mode. FIG. 8 is a schematic view illustrating the passenger compartment at a front seat mode.

The control mode of the air-conditioner 100 has a normal mode and a centralized-control mode. The normal mode is a control mode in which the centralized-control switch 55 is not pushed. Therefore, in the normal mode in which the centralized-control switch 55 is not pushed, for example, the blow-off mode is suitably changed by operation of the various switches of the control panel 90.

The centralized-control mode is a control mode in which the centralized-control switch 55 is pushed. The centralized-control mode is a control mode in which at least one predetermined seat of seats (all the seats) is air-conditioned in the concentrated state. In the present embodiment, the predetermined seat is set as the driver seat or the front seat (driver seat and passenger seat). The centralized-control mode has a front seat mode which air-conditions the front seat, a single seat mode which air-conditions only the driver seat, and an all seat mode which air-conditions all the seats (front seat and rear seat).

As shown in FIG. 6, if a first condition is satisfied in the normal mode, it is shifted to the centralized-control mode. The first condition is satisfied when the centralized-control switch 55 is operated (when the centralized-control switch 55 is turned on) in the normal mode. In other words, if the centralized-control switch 55 is operated in the normal mode, it is shifted to the centralized-control mode.

Moreover, if a second condition is satisfied in the centralized-control mode, it is shifted to the normal mode. The second condition is satisfied when the centralized-control switch 55 is further operated (when the centralized-control switch 55 is turned off) in the centralized-control mode, or when the air conditioning demand for the rear seat is inputted by the control panel 90. Therefore, if the centralized-control switch 55 is operated in the centralized-control mode, it is shifted to the normal mode. Moreover, if the air conditioning demand for the rear seat is inputted, it is shifted to the normal mode, because it is necessary to also air-condition the rear seat.

Next, transition among the three modes in the centralized-control mode is explained. When the normal mode is shifted to the centralized-control mode, first, the front seat mode will be carried out. In the front seat mode, the temperature control is conducted relative to the front seat space, and the intake and blow-off mode is also changed into "the front seat mode." For example, the intake mode is set as the inside air mode, and the inside/outside air change door 3 opens the inside air inlet port 6 located at the lower part of the driver seat and the lower part of the passenger seat. Moreover, all the air outlets opened to the rear seat air conditioning space in which no occupant is present are closed by the respective doors. For example, in FIG. 2, the rear seat side center face air outlet 91 (arrow direction C1, C2 in FIG. 2), the rear seat side face air outlet 92 (arrow direction D1 in FIG. 2) and the rear seat side foot air outlet 93 (arrow direction F1, F2 in FIG. 2) are closed, and the residual air outlets 20, 21, 22, 23, 30, 31, 32, 33 (arrow direction A1, A2, B1, B2, E1, E2, G1, G2, H1 in FIG. 2) are opened. Moreover, for example as shown in FIG. 8, because the intake and blow-off mode is set into "the front seat mode", the air conditioning area is limited to the front seat by closing the air outlets 91, 93 and by opening the residual air outlets 21, 22, 31, 32. In addition, although only the arrow direction D1, H1 is shown in FIG. 2, there shall be a flow of conditioned-air shown by the arrow direction D2, H2 similarly on the passenger seat side.

Next, the single seat mode is explained. As shown in FIG. 6, when a third condition is satisfied in the case where the front seat mode is set, it is shifted to the single seat mode. The third condition is satisfied (1) when no occupant exists in the passenger seat, and (2) when the blower 4 is ON, and (3) when the humidity is low so that there is no fogging (for example, humidity <100%), or (3) when it is not summer (for example, outside air temperature >40° C.) and not winter (for example, outside air temperature 0° C.). Therefore, it is determined that occupants are located only in the front seat when an occupant is in the passenger seat and when the centralized-control mode is set, such that the front seat mode is carried out in which the air conditioning range is set for only the front seat.

The single seat mode is a mode where the occupant is only a driver, in this case, the intake and blow-off mode is changed to "the single seat mode" as a mode where the temperature control is conducted for the driver seat space. For example, the intake mode is set as the inside air mode, so the inside air inlet port 6, which is located at the lower part on the driver seat side, is opened by the inside/outside air switch door 3. Moreover, all the air outlets 30-33 opening to the passenger seat side air conditioning space in which no occupant is present are closed by the respective doors 34-36. For example, in FIG. 2, the air outlets 30, 31, 32, 33, 91, 92, 93 surrounded by the imaginary line are closed, and the air outlets 20, 21, 22, 23 surrounded by the solid line are opened. Moreover, for example as shown in FIG. 7, because the intake and blow-off mode is set to "the single seat mode", the air outlets 31, 32, 91, 93 are closed and the residual air outlets 21, 22 are opened, so as to limit the air conditioning range to the driver seat.

In the single seat mode, when the fourth condition is satisfied, it is shifted to the front seat mode. The fourth condition is met when the third condition is not satisfied. Therefore, for example when an occupant is seated to the passenger seat in the single seat mode, the fourth condition is satisfied and it is shifted to the front seat mode. Moreover, in the single seat mode, when the air amount is made zero through, for example, the off-switch 51 or the blower air-amount changeover switch 87, by inputting the stop command which stops the air sending by the blower 4, the fourth condition is satisfied and it is shifted to the front seat mode.

Next, the all seat mode is explained. As shown in FIG. 6, when the fifth condition is satisfied in the front seat mode, it is shifted to the all seat mode. The fifth condition is satisfied (2) when the blower 4 is ON, and (1) when the humidity is high such that fogging is generated (for example: humidity >100%) or (2) when it is very hot in summer (for example: outside air temperature >45° C.) or it is very cold in winter (for example: outside air temperature <−5° C.). Therefore, even in the centralized-control mode, when high air conditioning capacity is required in the case where it is very hot in summer, for example, it is shifted to the all seat mode in order to immediately air-condition the inside of the passenger compartment. Specific control content of the all seat mode is different depending on the environment in the passenger compartment, such that the maximum heating mode, the maximum cooling mode, or the maximum dehumidification mode is carried out according to the environment in the passenger compartment. In the all seat mode, at least one door is opened among the air outlets for the rear seat air conditioning space. For example, in FIG. 2, the rear seat side center face air outlet 91 (the arrow direction C1, C2 in FIG. 2), the rear seat side face air outlet 92 (arrow direction D1 in FIG. 2), and the rear seat side foot air outlet 93 (the arrow direction F1, F2 in FIG. 2) are opened.

In the all seat mode, when the sixth condition is satisfied, it is shifted to the front seat mode. The sixth condition is met when the fifth condition is not satisfied. Therefore, for example in the all seat mode, when the humidity is lowered by the maximum dehumidification mode, the sixth condition is satisfied and it is shifted to the front seat mode. Moreover, in the all seat mode, when the air amount is set zero, for example, with the off-switch 51 or the blower air-amount changeover switch 87, by inputting the stop command which stops the air sending by the blower 4, the sixth condition is satisfied and it is shifted to the front seat mode.

When the ignition is turned OFF, the air-conditioner ECU 10 memorizes whether it is in the centralized-control mode or the normal mode in the memory at the time of the ignition OFF. Then, when the ignition is turned ON, the air-conditioner ECU 10 reads the latest control mode memorized in the memory and controls to realize the read control mode. For example, when the ignition is turned OFF at the time of centralized-control mode and when the ignition is turned ON next, the centralized-control mode is set. Thereby, it can be started from the control mode at the time of the ignition OFF.

As explained above, when the centralized-control switch 55 is operated to provide a predetermined seat air conditioning command which air-conditions the driver seat corresponding to a predetermined seat, the air-conditioner ECU 10 of this embodiment controls the pasenger seat side doors 34-36 etc. are controlled to the intercepted state as the centralized-control mode (control of a predetermined seat state). By setting the intercepted state, the conditioned-air can be sent only to the driver seat or the front seat. Therefore, because the air conditioning range becomes small than that for the normal mode, the air conditioning load can be reduced.

When the stop command of the blower 4 is given in the centralized-control mode, the air-conditioner ECU 10 controls the blower 4 to stop sending air. Furthermore, the air-conditioner ECU 10 opens at least one of the air outlets corresponding to the other seat, so that the sum of the opening areas of the air outlets in the open state after the blower 4 is stopped becomes more than or equal to the sum of the opening areas of the air outlets in the open state at the centralized-control mode. Therefore, if the stop command is given, the opening-and-closing state of each air outlet is controlled, and the sum of the opening areas of the air outlets in the open state will become more than or equal to it. Thereby, when the pressure of the outside air introduced from the outside air inlet port 7 becomes high, for example, due to a rise in the vehicle speed, etc., and when the outside air introduced from the outside air inlet port 7 flows into the passenger compartment, the air outlet for the other seat such as the rear seat is opened so as to make the opening area to be larger than or equal to that before the blower 4 is stopped. Thus, the air flowing into can be distributed between the rear seat and the predetermined seat. Accordingly, the driver is restricted from feeling uncomfortable.

Moreover, when the inside air taken from the inside air inlet port 6 is blown off from the air outlet, for example, for circulating the inside air, even if the blower 4 is stopped, the opening area is made more than or equal to it, and the passage of the circulating air is distributed. Therefore, the humidity is restricted from increasing and the window is restricted from fogging. Thereby, in the case where the blower 4 is stopped while carrying out the control with the centralized-control mode, the driver seat is restricted from becoming uncomfortable.

Moreover, in the present embodiment, when the stop command of the blower 4 is given in the centralized-control mode, the air-conditioner ECU 10 controls the blower 4 to stop sending air, and controls each door to increase the number of the air outlets in the open state rather than the number of the air outlets in the open state at the single seat mode. Specifically, the control is performed to set the front seat mode from the single seat mode (when the fourth condition is satisfied). Therefore, if the stop command is given, the opening-and-closing state of each air outlet is controlled, and the number of the air outlets in the open state is increased. Thereby, when the pressure of the outside air introduced from the outside air inlet port 7 becomes high, for example, due to a rise in the vehicle speed, etc., and when the outside air introduced from the outside air inlet port 7 flows into the passenger compartment, the number of the air outlets in the open state is increased so as to further distribute the air flowing into. Thus, the driver is restricted from feeling uncomfortable.

Moreover, when the inside air taken from the inside air inlet port 6 is blown off from the air outlet, for example, for circulating the inside air, even if the blower 4 is stopped, the number of the air outlets in the open state is increased, so the passage for the circulating air is increased. Therefore, the humidity is restricted from increasing and the window fogging can be further controlled. Thereby, if the blower 4 is stopped while carrying out the control with the centralized-control mode, the driver seat is restricted from becoming uncomfortable.

Moreover, in the present embodiment, the air-conditioner ECU 10 controls each door in a manner that the number of the air outlets which are in the open state is larger than the number of the air outlets in the open state at the single seat mode and is smaller than the number of all the air outlets. The number of the air outlets in the open state is smaller than the number of all the air outlets. If all the air outlets are made into the open state, the power required for changing into the open state is increased, and the time period required for changing into the open state becomes long. Then, in the present embodiment, the above described advantages obtained by increasing the number of the air outlets can be achieved while the power required for changing into the open state is restricted from increasing and the time period required for changing into the open state is restricted from becoming long by restricting the number of the air outlets changed into the open state.

Furthermore, in the present embodiment, if the blower 4 is turned OFF in the single seat mode, the air-conditioner ECU 10 controls each door in a manner that the air outlets covering the air conditioning range for the driver seat and the passenger seat are opened and that the air outlets covering the air conditioning range for the rear seat are closed (control to set the front seat mode). In other words, it is shifted to the front seat mode and waits, if the other mode other than the front seat mode is set (in the case of the single seat mode or the all seat mode) in the centralized-control mode in which air conditioning is conducted for the front seat or the driver seat, at a time of except-system-OFF (=except-blower-OFF)=>manual-system-OFF (=blower-OFF). Therefore, the number of the air outlets in the open state is made more than the number of the air outlets at the single seat mode in which only the driver seat is the air conditioning range, and is made smaller than the number of the air outlets at the all seat mode in which all the seats (driver seat, passenger seat, and rear seat) are in the air conditioning range. Thus, the above described advantages obtained by increasing the number of the air outlets can be achieved while the power required for changing into the open state is restricted from increasing and the time period required for changing into the open state is made short by restricting the number of the air outlets changed into the open state. Moreover, the front seat mode is a state between the single seat mode and the all seat mode. Therefore, the shift to the single seat mode or the all seat mode from the front seat mode can be performed in a short time compared with the shift between the single seat mode and the all seat state. Therefore, by setting the front seat mode when the blower 4 is stopped, when the blower 4 is again started, the shift can be performed in a short time even if it shifts to the single seat mode or the all seat mode.

Operation and effect of this embodiment are put in another way. In the case of the system-OFF (=blower OFF), when the single seat mode is changed to the front seat mode, the number of the air outlets in the open state increases, thereby reducing the influence of the ram pressure at the time of outside air mode. Moreover, if the single seat mode is changed to the front seat mode in the case of the system-OFF (=blower OFF), the number of the air outlets in the open state increases, thereby reducing the fogging at the time of inside air mode and the rise in the temperature (with fogging) of the rear seat caused by heat of a battery. Moreover, because the front seat mode is set when the blower is ON to recover from the blower OFF, it can be changed in the shortest time to the all seat mode or the single seat mode.

In the case of the system-OFF (=blower OFF) manually at the time of the single seat mode, the humidity easily becomes high in the passenger compartment, so it is shifted to the front seat mode in order to improve the situation, also in the case where the battery cooling is required at high temperature. Moreover, when the system is turned ON from OFF, it stands with the front seat mode, so transition is made possible immediately to both the all seat mode and the single seat mode. At the time of outside air mode and single seat mode, the blower motor is turned OFF to restrict the air amount from increasing even under the influence of ram pressure generated when the vehicle drives with high speed. When the blower 4 is OFF and when the inside/outside air change door 3 is set into the inside air mode, there is no air blown off from the air outlets and the humidity becomes high inside of the passenger compartment so fogging is easily generated. At this time, the fogging can be reduced by changing the air outlets from the single seat mode to the front seat mode.

The present disclosure is described above, and is not limited to the above embodiment. Changes and modifications are to be understood as being within the scope of the present disclosure.

In the above embodiment, when the blower 4 is stopped in the centralized-control mode, it is controlled to shift to the front seat mode, but is not limited to the shift to the front seat mode, such that by closing the air outlets which were in the open state at the centralized-control mode and by opening the air outlets for the rear seat, it is enough that the sum of the opening area after the stop is larger than or equal to the sum of the opening area before the stop. With such control, the air outlets can be dispersed between the driver seat and the rear seat, and the effect by the dispersion can be acquired. Therefore, for example in a case where the driver seat side center face air outlet 21 is open and the driver seat side foot air outlet 23 is closed in the centralized-control mode, if a stop command is given, the driver seat side center face air outlet 21 is closed, the driver seat side foot air outlet 23 is opened, and the air outlets for the rear seat may be opened from the closed state. Moreover, for example in a case where the driver seat side center face air outlet 21 is open and the driver seat side foot air outlet 23 is open in the centralized-control mode, if a stop command is given, the driver seat side center face air outlet 21 is closed, the driver seat side foot air outlet 23 is closed, and the plural air outlets for the rear seat may be opened from the closed state, such that the control is conducted not to decrease the opening area. By closing all the air outlets that face the driver seat, the driver can be restricted from receiving air caused by the ram pressure.

Further, in the above embodiment, when the blower 4 is stopped in the centralized-control mode, it is controlled to shift to the front seat mode, but is not limited to the shift to the front seat mode, such that the control is conducted to increase the number of the air outlets in the open state. For example, it may be shifted to the all seat mode from the single seat mode, and may be controlled to open the air outlets covering the air conditioning range for the driver seat and the rear seat from the single seat mode.

Moreover, in the above embodiment, it is not necessary to open all the air outlets covering the air conditioning range for the driver seat in the single seat mode, and it is enough to open at least one air outlet covering the air conditioning range. The air outlet which is changed into the open state is suitably set up by the blow-off mode.

Moreover, in the above embodiment, when the centralized-control switch 55 is pushed, it is determined that no occupant exist in the rear seat, alternatively, an occupant detecting element may be prepared in the rear seat so as to detect the seating state of the rear seat. In other words, in the embodiment, an occupant detecting element is prepared only in a passenger seat, and it is not prepared in the other seats, but it may be prepared in all the seats without restrict to such composition. Moreover, although the seating sensor arranged on the seat and the buckle sensor are used for the occupant detecting element in the above-mentioned embodiment, existence or nonexistence of an occupant may be detected for each seat by IR (non-contact infrared temperature) sensor arranged to the instrument panel. Moreover, the existence or nonexistence of the occupant for each seat may be presumed using the open or close signal of the door for each seat, and the existence or nonexistence of the occupant for each seat may be determined combining these means.

Moreover, in the above-mentioned embodiment, although the actuator is realized by the servo motor, the actuator may be the residual actuator such as bimetal and shape memory alloy without limited to the servo motor.

Moreover, in the above-mentioned embodiment, the air-conditioner 100 can air-condition independently the driver seat side space and the passenger seat side space in the passenger compartment, but it is not restricted to such composition and may be an air-conditioner which cannot air-condition independently.

It is understood that the present disclosure is not limited to the embodiment concerned and structure. The present disclosure also includes various modifications and modification within the equivalent range. In addition, it goes into the category and thought range of this indication of suitable various combination and forms, and other combination and forms to which only an element contains more than it or less than it in them further.

What claimed is:

1. An air-conditioner for a vehicle comprising:
    an air conditioning case having an air intake port on a first side and a plurality of air outlets on a second side, air passing through the plurality of air outlets toward a passenger compartment, the plurality of air outlets being opened to correspond to a plurality of seats including a predetermined seat, which contains at least a driver seat, and the other seat, the air conditioning case having an air passage between the air intake port and the plurality of air outlets, blow-off air passing through the air passage;
    an air conditioning blower sending air to the air passage of the air conditioning case;
    an air conditioning part which heats or cools to air-condition the air sent from the air conditioning blower and sends conditioned-air to the plurality of air outlets;
    an opening-and-closing part which changes opening-and-closing state of the plurality of air outlets between an allowed state and an intercepted state, conditioned-air being allowed to pass an air outlet of the plurality of air outlets which air-conditions the other seat except the predetermined seat in the allowed state and being intercepted in the intercepted state, conditioned-air being allowed to pass an air outlet of the plurality of air outlets which air-conditions the predetermined seat in the intercepted state; and
    a control part which conducts an air conditioning for the passenger compartment by controlling the air conditioning blower, the air conditioning part and the opening-and-closing part, wherein
    the control part controls the opening-and-closing part into the intercepted state as a control of a predetermined seat state, when a predetermined seat air conditioning command is provided to air-condition the predetermined seat,
    when a stop command which requires to stop the air conditioning blower is provided in the predetermined seat state, the control part controls the air conditioning blower to stop sending air, and
    after the air conditioning blower is stopped, the control part controls the opening-and-closing part to open at least one air outlet of the plurality of air outlets which air-conditions the other seat in a manner that a total open area of the air outlets becomes larger than or equal to a total open area of the air outlets in the predetermined seat state.

2. The air-conditioner according to claim 1, wherein
    when the stop command is provided in the predetermined seat state, the control part controls the air conditioning blower to stop sending air, and
    the control part controls the opening-and-closing part to increase the number of the air outlets in open state rather than the number of the air outlets in open state in the predetermined seat state.

3. The air-conditioner according to claim 1, wherein
    the predetermined seat is the driver seat,
    the other seat is a passenger seat and a rear seat, and
    when the stop command is provided in the predetermined seat state, the control part controls the air conditioning blower to stop sending air, and
    the control part controls the opening-and-closing part to open the air outlet which air-conditions the driver seat and the passenger seat and to close the air outlet which air-conditions the rear seat.

4. The air-conditioner according to claim 1, wherein
    when the stop command is provided in the predetermined seat state, the control part controls the air conditioning blower to stop sending air, and
    the control part controls the opening-and-closing part to open the air outlets whose number is larger than the number of air outlets in open state in the predetermined seat state and is smaller than the all number of the air outlets.

5. The air-conditioner according to claim 1, wherein
    the control part controls the opening-and-closing part to open all the plurality of outlets when an all seat air conditioning demand is provided to air-condition the predetermined seat and the other seat, and
    the control part controls the blower to stop sending air and controls the opening-and-closing part to close an outlet of the plurality of air outlets which air-conditions a rear seat of the other seat when the stop command is provided in the state where the all seat air conditioning demand is provided.

* * * * *